Nov. 11, 1941.    F. W. GUIBERT ET AL    2,262,231
LIQUID METERING DEVICE
Filed Sept. 5, 1939    3 Sheets-Sheet 1
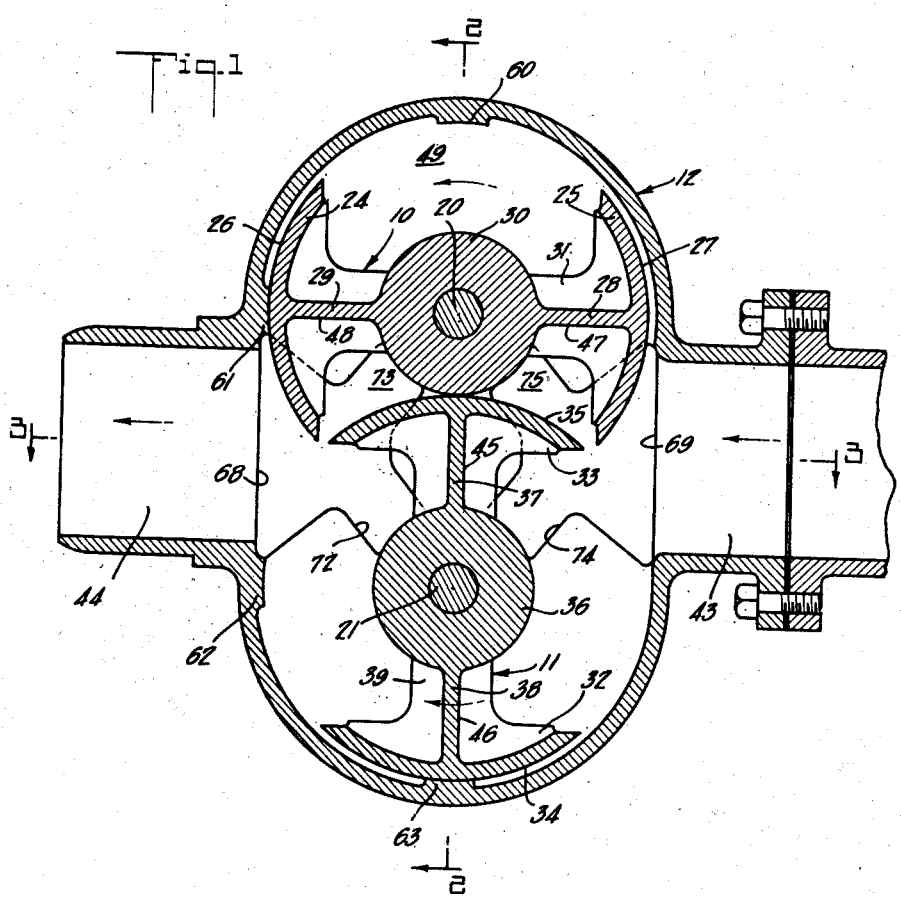
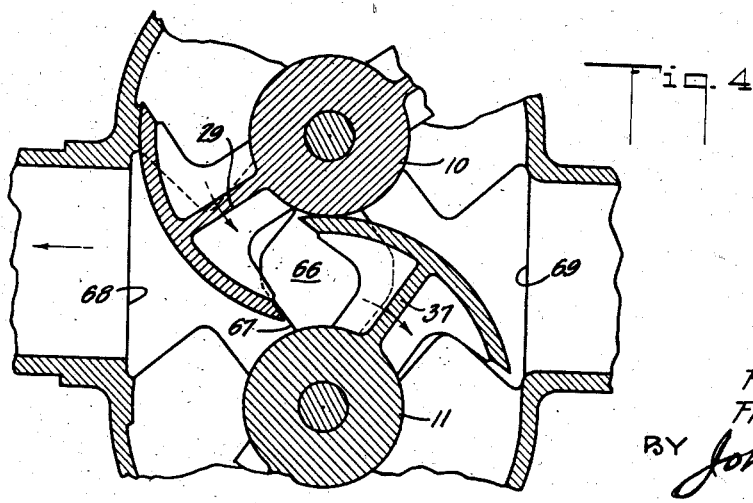
INVENTORS
Francis W. Guibert
Frederic B. Fuller
BY John Flann
ATTORNEY Nov. 11, 1941.　　F. W. GUIBERT ET AL　　2,262,231
LIQUID METERING DEVICE
Filed Sept. 5, 1939　　3 Sheets-Sheet 2

INVENTORS
Francis W. Guibert
Frederic B. Fuller
BY John Flann
ATTORNEY

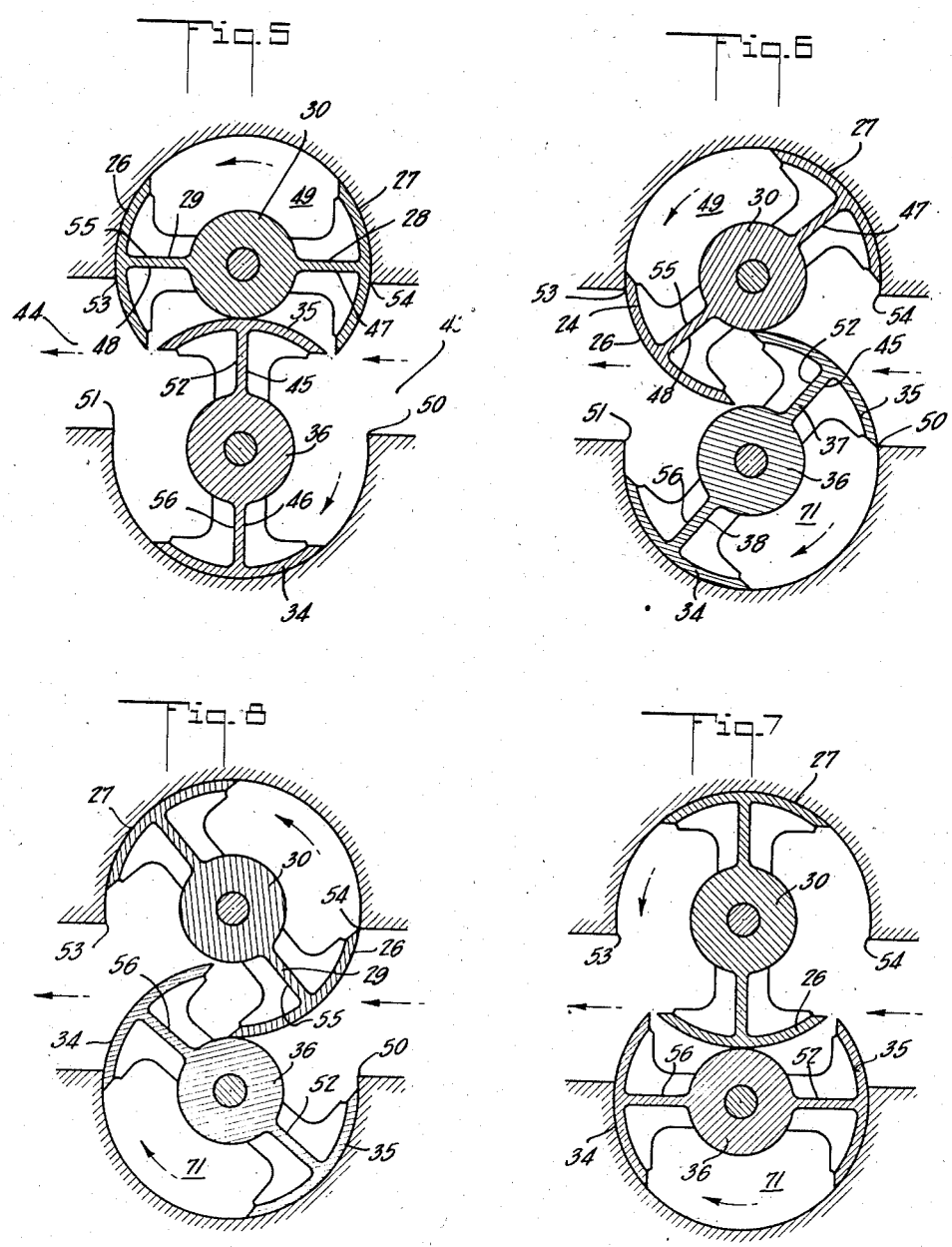

Patented Nov. 11, 1941

2,262,231

UNITED STATES PATENT OFFICE 2,262,231

LIQUID METERING DEVICE

Francis W. Guibert, Beverly Hills, and Frederic B. Fuller, Whittier, Calif.; said Fuller assignor to said Guibert Application September 5, 1939, Serial No. 293,324

5 Claims. (Cl. 73—261)

This application relates to a liquid metering device.

It is an object of this invention to provide an accurately functioning meter in which there are no reciprocating parts and in which the moving parts have only a rotary motion.

Liquid metering devices of this general character are characterized by the provision of rotors having cavities therein alternatively filled with liquid from the inlet of the meter, and then at least partially discharged into the outlet upon rotation of the rotor.

It is another object of this invention to ensure that the meter will operate without injurious pressure effects that may be occasioned by the trapping of liquid between the rotors.

It is a further object of this invention to provide such a device which is more readily machined to the required dimensions.

It is still another object of this invention to provide a metering device which is accurate at normal, subnormal, or high temperatures without need of adjustment.

Referring to the drawings:

Figure 1 is a transverse section through a metering device embodying the invention;

Fig. 4 is a fragmentary view showing the rotors of the measuring device in a different position from that of Fig. 1; and Figs. 5, 6, 7 and 8 are diagrammatic sectional views, similar to Fig. 1, but illustrating differing positions of the rotors.

Figure 2:
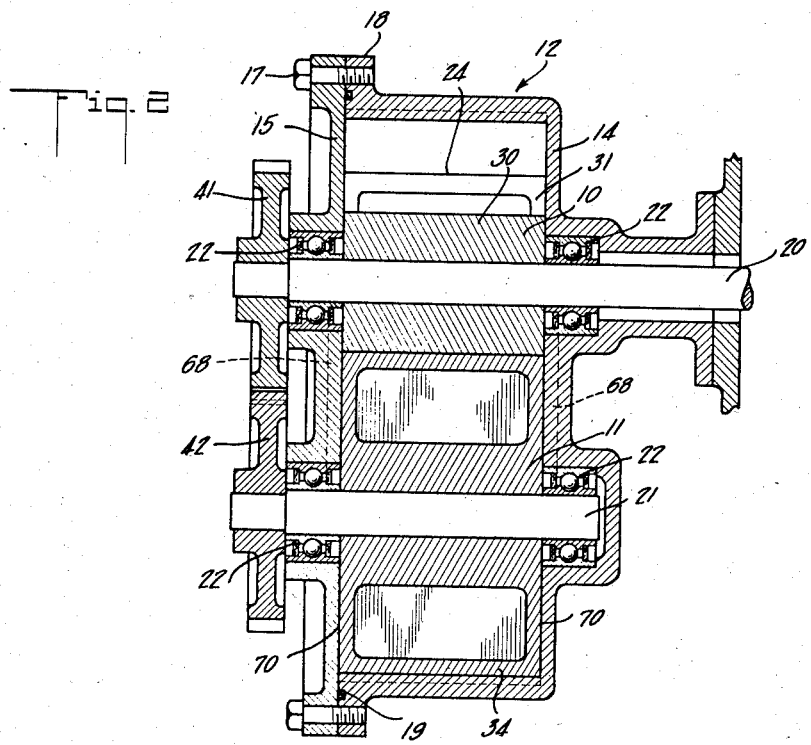
Figs. 2 and 3 are sections on a slightly reduced scale as seen on correspondingly numbered planes of Fig. 1.
Figure 3:
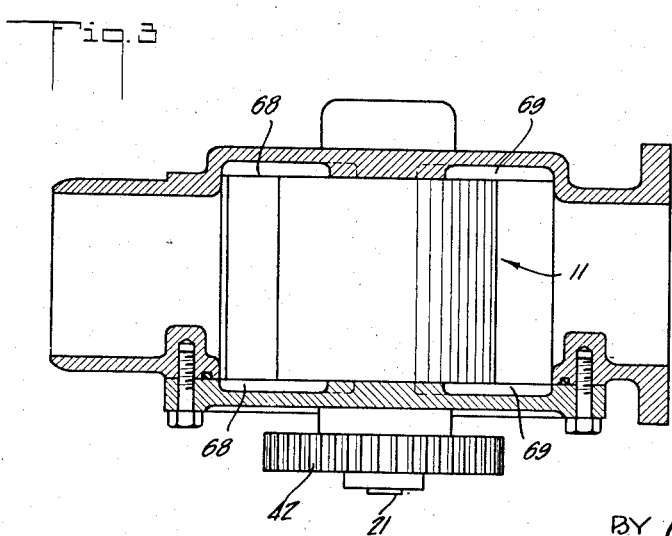

The measuring device is of that type which includes a pair of identical rotors rotatably supported tangentially with respect to each other in a fluid tight housing, the rotors cooperating with each other and the housing to deliver a definite quantity of liquid upon rotation of the rotors. The passage of liquid through the meter causes the rotors to revolve; and thus the number of revolutions of the rotors is a function of the quantity of liquid passing through the meter. By arranging a suitably calibrated counting device to be driven by one of the rotors, the quantity of liquid may be directly indicated.

The meter includes the rotors 10 and 11 which, as previously mentioned, are substantially identical and are rotatably supported within a casing or housing generally indicated by 12. Housing 12 is closed at one side by an integral wall 14 and at the other side by a detachable cover 15, secured to housing 12 in any convenient manner as by cap screws 17 which engage a flange 18 formed on the housing. A gasket 19 between cover 15 and housing 12 prevents leakage at this joint. The rotors 10 and 11 are of such axial length that their end surfaces 70 (Fig. 2) are in fluid tight contact with the surfaces at the opposite sides of casing 12.

The rotors 10 and 11 are mounted respectively on shafts 20 and 21, which are rotatably supported as by the aid of antifriction bearings 22 located in appropriately formed recesses in casing wall 14 and cover 15.

Rotor 10 has a pair of oppositely directed portions or lobes 24 and 25, each of which includes outer peripheral portions 26, 27. These portions 26, 27 are arranged to make fluid tight contact with the corresponding curved portions of housing 12. Blades 28, 29 connect the peripheral portions 26, 27 with a smaller central portion or hub 30. Blades 28, 29 as well as the outer portions 26, 27 are made relatively thin, to reduce the weight of the rotor as much as possible. The rotors have end walls 31 also joining the portions 26, 27 to the hub 30.

Rotor 11 is substantially of the same construction as rotor 10, and includes the oppositely directed lobes 32 and 33, each of which has respectively the outer peripheral portions 34 and 35 in fluid tight contact with casing 12, and joined to a central portion or hub 36 by blades 37 and 38. Stiffening flanges 39 are provided as before.

Thus, each of the rotors 10 and 11 has respectively a pair of oppositely disposed portions 24, 25, and 32, 33, making substantially fluid tight contact with the curved portions of casing 12, as well as intermediate portions 30 and 36 of reduced diameter. In this case, the peripheral portions 26, 27, 34 and 35 of each lobe 24, 25, 32 or 33 extend over an angle of one fourth the circumference, or 90°, less a small amount of clearance. The meter is assumed with the lobes 24, 25 of one rotor arranged at right angles with the lobes 32, 33 of the other rotor. Thus, the periphery 34 or 35 of lobe 32 or 33 of rotor 11 is in contact with the small diameter portion or hub 30 of rotor 10 (see Fig. 1).

By providing rotors having an even number of lobes (such as the two lobes 24, 25 for rotor 10, or the two lobes 32, 33 for rotor 11), an inherently balanced structure is obtained.

In meters of the kind described, using interengaging lobes 24, 25, 32, 33, the outer lobe surfaces coacts with and seals at times against the hub 30 or 36 of the other rotor for performing the measuring function. The amount of the metered liquid per revolution of the rotors is a function of the diameter of the outer surface of the lobes, and of the diameter of the hubs 30, 36. The smaller the hubs, the greater the amount of liquid metered per revolution. Since it is essential for the metering function that the radii of portions 26, 27, 34, and 35 be large enough to contact the hub surfaces, a reduction in the hub diameter necessarily involves an increase in the lobe diameter, the center distance being kept constant between the rotor axes. Therefore it is important, for maximum metered delivery, to make the hub diameter as small as practicable. In spite of practical limits in the design, prescribed by the necessity of having the lobar portions 24, 25, 32, 33 pass each other without interference, the radius of the hubs 30, 36 may be made as little as one third the radius of the lobar portions. Reducing the hub radii materially below this value becomes impractical, because of the necessity for intermeshing the lobes. With two-lobe rotors, the radius for the hubs 30, 36 may be thus made quite small in relation to the radius of the lobes.

Due to the symmetry of the structure, the angular extent of the periphery of each lobe is substantially equal to the angular spacing between these portions. Thus, starting from the relative positions of Fig. 1, for example, if the rotors are compelled to rotate at the same angular rate and in opposite directions, the periphery of one of the lobes will always be in contact with one surface of the hub of the other rotor. Proper relative positions of the rotors is assured at all times by intermeshing gears 41 and 42, secured respectively to shafts 20 and 21. An appropriate gear case (not shown) for enclosing gears 41 and 42 may be provided if desired.

Adjacent the point of contact between rotors 10 and 11, casing 12 is provided at one side with an inlet 43 and at the opposite side with an outlet 44.

Referring to the diagram, Fig. 5, with liquid under pressure entering housing 12 through inlet 43, the surfaces 45 and 46 respectively of the radial blades 37 and 38 of rotor 11 are both exposed to the inlet pressure. Since these surfaces are designed to be equal and are disposed on opposite sides of the axis of shaft 21, pivotally supporting the rotor, the turning moments caused by the inlet pressure are equal and opposite, and hence neutralize. The opposite surfaces 52 and 56 of blades 37 and 38 are similarly equal and exposed to the pressure in the outlet side of the housing 12. This pressure is of course lower than that prevailing in the inlet side and is similarly without effect on the rotor 11.

In the case of the upper rotor 10, the lower surface 47 of blade 28 is exposed to inlet pressure, because of the clearance between adjacent edges of portions 27 and 35. The lower surface 48 of blade 29 is similarly subject to outlet pressure, the inlet pressure being prevented from reaching it by the contact between portion 35 and hub 30. Within the space 49 defined by the upper part of the housing 12 and the blades 28 and 29, a body of liquid is trapped. This body of liquid is under practically no pressure. At any rate, this liquid is without effect on the rotor, since the surfaces on which it acts are equal in area and on opposite sides of the axis of shaft 20. Accordingly, the forces on rotor 10 are unbalanced and this rotor will turn in a counterclockwise direction. The other rotor 11 will be driven by rotor 10, due to the interconnecting gearing, in a clockwise direction.

A predetermined quantity of liquid is delivered from the inlet 43 to the outlet 44 for each revolution of the rotors 10, 11, and constitutes the metering function of the apparatus. For each revolution, delivery occurs twice for each rotor 10, 11, from the spaces corresponding to space 49, 71 of Fig. 6. This quantity is equal to the volume of a full cylinder of the same dimensions as the rotors, minus one of the same dimensions as the hubs.

Due to the unbalanced forces acting on the rotors, the device will function as a motor. This power output may be conveniently used to operate some form of indicating mechanism; if desired, this power may also be used to drive mechanism for automatically starting and stopping the delivery of liquid by the meter in accordance with predetermined conditions as to quantity, pressure, etc. For operating such apparatus, one of the rotor shafts, as 20, is arranged to extend through the casing wall 14, as shown in Fig. 2.

As the rotors advance from the position of Fig. 5 to that of Fig. 6, the advancing edge of portion 35 will ultimately contact and pass the edge 50 of casing 12. Thus liquid will be trapped in the cavity 71 defined by the side of casing 12, hub 36 and blades 37, 38. This liquid will be carried around by the rotation of rotor 11. Further movement of the rotor causes portion 34 to pass beyond edge 51, causing discharge of some of the liquid in space 71 into the outlet 44.

The pressure of the liquid acting on surface 47 of rotor 10 advances the rotors from the position of Fig. 5 to that of Fig. 6. However, at about the position illustrated in Fig. 6, rotor 10 ceases to drive, and rotor 11 drives. This occurs because portion 35 passes out of contact with the surface of hub 30; and portion 26 of lobe 24 of the upper rotor 10 contacts the surface of hub 36. Inlet pressure is now effective on both surfaces 47, 48 of rotor 10 which becomes balanced, while inlet pressure is effective on only the surface 52 of lower rotor 11, which becomes unbalanced and does the driving. Also, as soon as portion 26 passes beyond the end 53 of the upper circular surface in housing 12, some of the liquid in space 49 is passed into the discharge 44. Rotor 11 continues to do the driving through the position of Fig. 7, until the position of Fig. 8 is reached approximately; here the advancing edge of portion 26 passes the edge 54 of the inlet and again traps liquid in the chamber formed by blades 28, 29, hub 30, and the upper wall of housing 12. At about this time, inlet pressure becomes effective on surface 55 of blade 29, causing rotor 10 to provide the driving force, rotor 11 being balanced by this pressure acting on surfaces 52 and 56.

In order to ensure accuracy, and proper sealing of the cavities even upon variations in temperature, the rotors and their housing are made of material having the same temperature coefficient.

In the diagrams Figs. 5-8, housing 12 has been shown as providing surfaces in contact respectively with rotors 11 and 10 extending in excess of 180°, from edges 50 to 51, and from edges 53 to 54 in a clockwise direction. However, since the angular movement of either rotor from the point where intake ceases and discharge begins is approximately 90°, this surface needs to be only of this extent approximately, and not necessarily continuous. In other words, the surface needs to be only such as simultaneously to engage adjacent ends of portions 26, 27, and 34, 35, during some portion of their motion.

The use of the sealing elements or surfaces so as to trap the liquid in the cavities between lobes does not interfere with the creation of a turning moment by fluid pressure, in the same direction for each rotor as before. For example, as shown in Fig. 1, a pair of septa 60, 61 and 62, 63 may be provided in place of surfaces 53, 54 and 50, 51 respectively. The septa in each pair are spaced 90° apart and are of sufficient angular extent to form seals with the ends of the lobes of the respective rotors. Either pair may be placed anywhere within the angular extent of the surface it replaces. It is not necessary for one septum of each pair to be adjacent the discharge port, as shown.

That these septa do not interfere with the creation of turning moments, for rotating rotors 10 and 11 in opposite directions, may be made clear by the aid of Fig. 1. There is a turning moment on rotor 10, because the intake pressure is effective on the lower surface 47 of blade 28, which is greater than the outlet pressure on lower surface 48 of blade 29. The intake pressures on the upper surfaces, by passage of intake liquid past the portion 27, neutralize. Similar considerations would apply to each of the positions illustrated in the other diagrams, Figs. 6, 7 and 8.

An important advantage of these angularly short septa is, that any grit or abrasive matter which may find its way into the motor is very much less apt to damage the seal between the casing and the rotors, or to cause the latter to stick. Thus for example, any solid matter getting between septum 60 and lobes 24, 25, needs to travel only the angular length of this septum before it is released and falls into the trapped liquid, and is discharged with the latter. Similarly any grit between septum 61 and either of the lobes 24, 25 only travels across the septum before it is discharged. This prevention of damage to the seals between the rotors and the housing is important in maintaining the accuracy of the device, since obviously any liquid which passes the rotors without causing a corresponding movement is not measured.

During that part of the cycle represented by Fig. 4, when blades 29 and 37 approach each other most closely, the volume of the space 66 defined between the lobes changes rapidly. And at one point, just a little beyond that illustrated, this space is entirely closed to both inlet and outlet. Thereafter, the space 66 opens into the inlet 43, the liquid in the space corresponding to the unmetered liquid that was carried around in the lobar cavities. Just before the actual closing of space 66 occurs, the passage 67 into this space is getting rapidly smaller. If the liquid is suddenly trapped in space 66, an annoying knock or water hammer would occur during rotation of the rotors. Similarly, when space 66 is opened to the inlet, free passage of the liquid to the inlet as soon as possible is essential to prevent annoying pressure effects.

To relieve this condition, pockets or sumps 68, 69 (Figs. 1, 2 and 4) are formed in the side wall 14 and cover 15 of housing 12 opposite the place where the rotor blades most closely approach each other. Thus, both ends of space 66 remain in communication with discharge passage 44 through these spaces 68 as well as opening 67, up to the instant where rotor 10 seals on the hub of rotor 11. Similarly on the inlet side, space 66 is immediately placed in communication with inlet 43 by means of spaces 69, just as soon as rotor 11 unseals the space 66. These sumps have the branches 72, 73 or 74, 75 having such contour that they are entirely covered by the end surfaces of the rotors at the same time that the closing off of space 66 occurs by the tangent contact between the rotors. At no time is liquid bypassed from the inlet to the discharge around the rotors, hence they do not impair the accuracy of the meter.

Devices of this character can be readily made to measure with a high degree of accuracy; of the order of one-half of one percent. The operation is analagous to that of a gear pump; in fact the device may be considered as such, having gears of two teeth only.

Since rotors in this character of apparatus may be required to rotate at a relatively high rate of speed of the order of 1500 to 2000 R. P. M., it is necessary that they be closely balanced. With rotors of the type shown, such balance is inherent, and special steps to obtain it are not needed.

Another important practical advantage of the type of rotor disclosed is the fact that the diameter of that portion of the hub which cooperates with the lobes and must be accurately determined, may be measured by a simple calipering operation.

What is claimed is:

1. In a liquid metering device, a pair of interlocking metering rotors each having two lobar portions having arcuate extent of substantially 90° and symmetrically disposed about the axis of the respective rotor, said rotors having peripheral recesses for coaction to deliver measured quantities of liquid, means for causing said rotors to rotate in unison in opposite directions, and a casing having an inlet and an outlet, and the rotors defining between the inlet and outlet, at one stage of their motion, a closed liquid space; said casing having a sump chamber establishing communication between the outlet side and the space defined between the rotors, said rotors having end surfaces with edges such that the edges of said sump chamber are substantially coincident with the edges of the rotor end surfaces when the rotors close the space between them, to shut off the said space from the outlet side.

2. In a liquid metering device, a pair of interlocking metering rotors, means for causing said rotors to rotate in unison, each of the rotors having two lobar portions each having an arcuate extent of substantially 90° and symmetrically disposed about the axis of the respective rotor, and adapted to interleave with the lobar portions of the other rotor and thereby to define a space between the lobes, and a casing for the rotors having an inlet and an outlet, said casing having in its end wall, a pair of sump chambers establishing communication respectively between the inlet side and said space, and between the outlet side and said space, said chambers being so formed that the end surfaces of the rotors place the chambers out of communication with said space at the same time that the interleaving space is closed by the coaction of the lobes, said end surfaces having edges that are substantially coincident with the edges of the chambers when the rotors arrive at the closed position.

3. In a liquid metering device, a pair of interlocking metering rotors, means for causing said rotors to rotate in unison, each of the rotors having two lobar portions each having an arcuate extent of substantially 90° and symmetrically disposed about the axis of the respective rotor, and adapted to interleave with the lobar portions of the other rotor and thereby to define a closed space between the lobar portions at a definite relative angular position of the interleaving lobar portions, and a casing for the rotors having therein an inlet opening and an outlet opening, both openings being directed in a direction transverse to the axes of rotation of the rotors, said casing having on at least one end wall in contact with the corresponding end surfaces of the rotors, a sump chamber in communication with the outlet side of the casing, and defined by edges adapted to be in alinement with the edges of the rotor end surfaces to interrupt communication from the space between the lobar portions and the sump when the lobar portions cooperate to close direct communication between the outlet side of the casing, and the said space.

4. In a liquid metering device, a pair of interlocking metering rotors, means for causing said rotors to rotate in unison, each of the rotors having two lobar portions each having an arcuate extent of substantially 90° and symmetrically disposed about the axis of the respective rotor, and adapted to interleave with the lobar portions of the other rotor and thereby to define a closed space between the lobar portions at a definite relative angular position of the interleaving lobar portions, and a casing for the rotors having therein an inlet opening and an outlet opening, both openings being directed in a direction transverse to the axes of rotation of the rotor, said casing having on at least one end wall in contact with the corresponding end surfaces of the rotors, a sump chamber in communication with the inlet side of the casing, and defined by edges adapted to be in alinement with the edges of the rotor end surfaces to establish communication from the space between the lobar portions to the sump when the rotors move away from the position where the lobar portions cooperate to form said closed space.

5. In a liquid metering device, a pair of interlocking metering rotors, means for causing said rotors to rotate in unison, each of the rotors having two lobar portions each having an arcuate extent of substantially 90° and symmetrically disposed about the axis of the respective rotor and adapted to interleave with the lobar portions of the other rotor and thereby to define a closed space between the lobar portions at a definite relative angular position of the interleaving lobar portions, and a casing for the rotors having therein an inlet opening and an outlet opening, both openings being directed in a direction transverse to the axes of rotation of the rotors, said casing having on at least one end wall in contact with the corresponding end surfaces of the rotors, a sump chamber in communication with the outlet side of the casing, and defined by edges adapted to be in alinement with the edges of the rotor end surfaces to interrupt communication from the space between the lobar portions and the sump when the lobar portions cooperate to close direct communication between the outlet side of the casing and the said space, said casing also having another sump similarly in communication with the inlet side of the casing and defined by edges adapted to be in alinement with the edges of the rotor end surfaces to establish communication from the said space to the last named sump when the rotors move away from the position where the lobar portions cooperate to form said closed space.

FRANCIS W. GUIBERT.
FREDERIC B. FULLER.